H. A. DESPAROIS.
SAW FILING MACHINE.
APPLICATION FILED SEPT. 27, 1916. RENEWED APR. 20, 1918.

1,267,062.

Patented May 21, 1918.
2 SHEETS—SHEET 1.

WITNESSES
O. Patenaude
A. P. Deal

INVENTOR
H. A. Desparois

By
Lew. O. Pigeon
Attorney

H. A. DESPAROIS.
SAW FILING MACHINE.
APPLICATION FILED SEPT. 27, 1916. RENEWED APR. 20, 1918.
1,267,062.
Patented May 21, 1918.
2 SHEETS—SHEET 2.
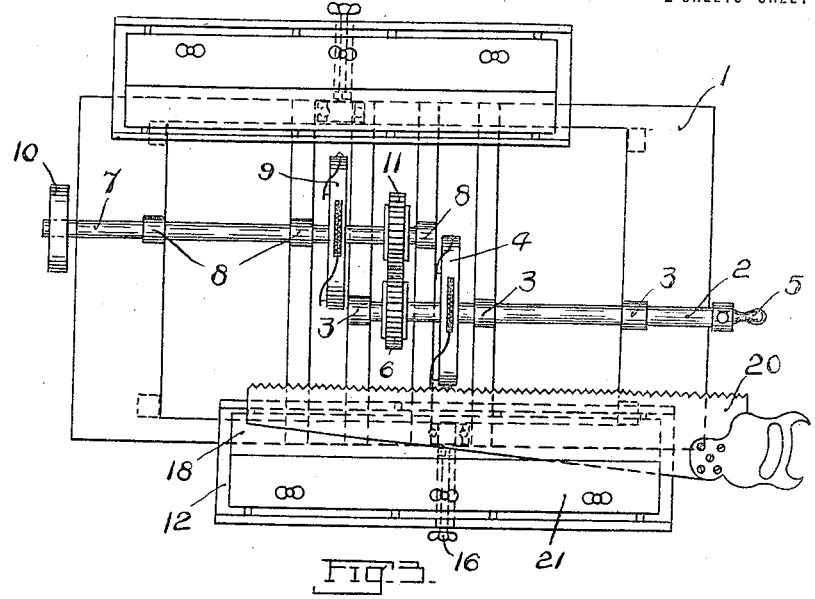
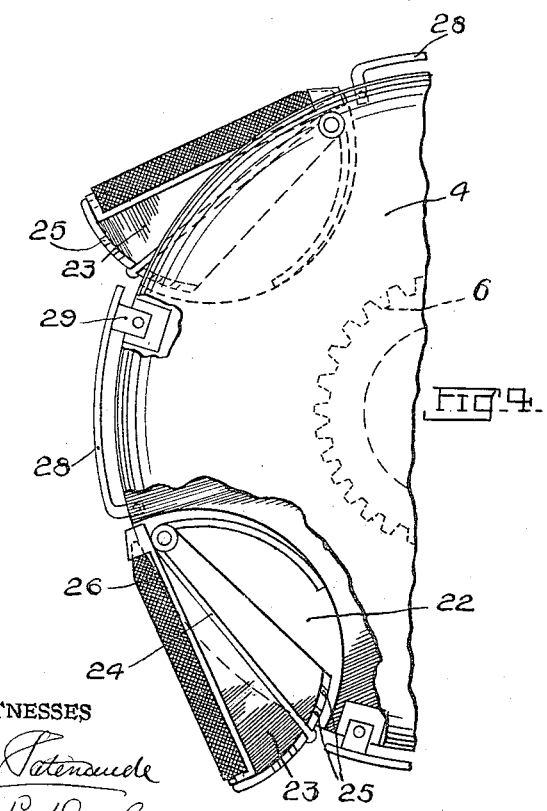
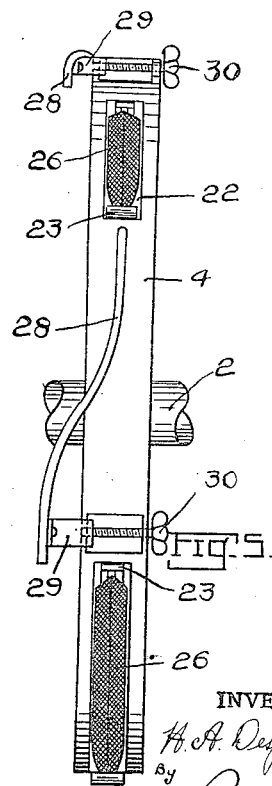
WITNESSES
INVENTOR
H. A. Desparois
By
Attorney

UNITED STATES PATENT OFFICE.

HARRY ARISTIDE DESPAROIS, OF MONTREAL, QUEBEC, CANADA, ASSIGNOR OF ONE-HALF TO EWART SAUNDERS FIELD, OF MONTREAL, QUEBEC, CANADA.

SAW-FILING MACHINE.

1,267,062.  Specification of Letters Patent.  Patented May 21, 1918.

Application filed September 27, 1916, Serial No. 122,464. Renewed April 20, 1918. Serial No. 229,869.

*To all whom it may concern:*

Be it known that I, HARRY ARISTIDE DESPAROIS, residing at 714 Drummond Bldg., in the city of Montreal, in the Province of Quebec, in the Dominion of Canada, have invented certain new and useful Improvements in Saw-Filing Machines; and I do hereby declare that the following is a full, clear, and exact description of the same.

The invention relates to improvements in a saw filing machine, and the object of the invention is to provide a machine that will file any kind of saw quickly and accurately and thus save considerable time and expense.

The invention consists of a bench, on which is mounted a wheel provided at different intervals with files which are adapted to engage each tooth. The bench is also provided with an adjustable and slidable holder, and the file carrying wheel is provided with means to automatically carry the saw in position for filing. The file carrying wheel may be operated by motive power or by hand.

In the drawings, Figure 1 is a side elevation of the invention.

Fig. 3 is a plan elevation of the invention.

Fig. 4 is an enlarged view of a portion of the wheel showing how the files are secured thereto.

Fig. 5 is an end view of the wheel, illustrating the means to carry each tooth in position for filing.

Like numerals of reference indicate corresponding parts in each figure.

Figure 1:
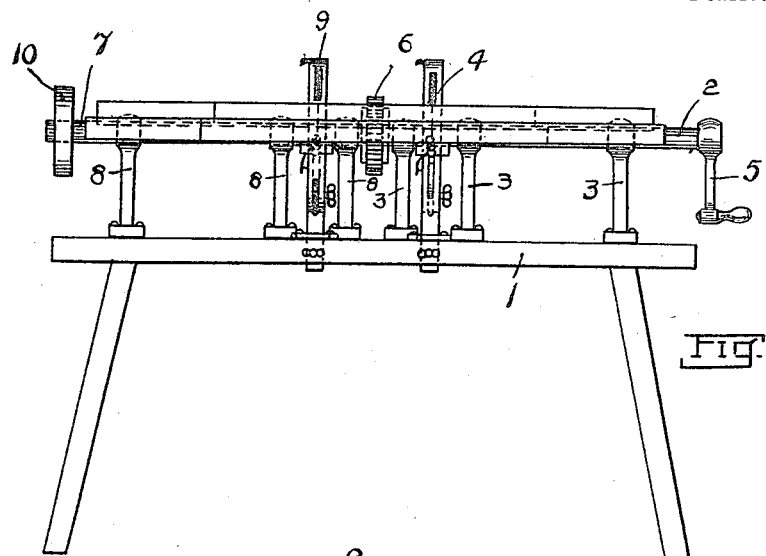
Figure 2:
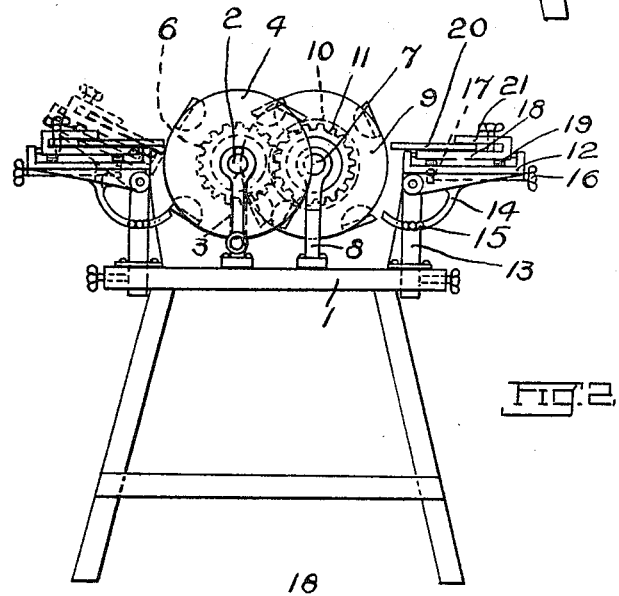
Fig. 2 is an end elevation of the invention.
Figure 6:
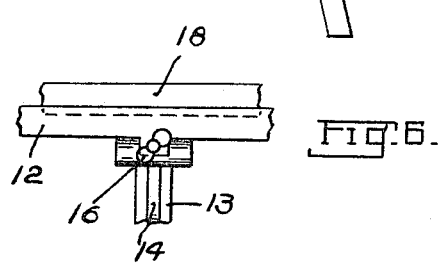
Fig. 6 is an enlarged detail view of a portion of the adjustable table.

In the drawings, 1 indicates a bench, and 2 is a shaft suitably journaled in the brackets 3 which are secured on the bench 1. 4 is a wheel mounted on said shaft 2 and secured thereto. 5 is a hand wheel mounted at the outer end of said shaft 2 in order to rotate the said wheel 4.

6 is a gear mounted on the inner end of said shaft 2. 7 is another shaft, similar in size to the said shaft 2, suitably journaled on the brackets 8 which are secured to the bench 1; and 9 is a wheel mounted on said shaft 7. 10 is a pulley adapted to be connected to any suitable source of power, and 11 is a gear mounted on the inner end of said shaft 7 and engaging said gear 6 mounted on the shaft 2.

It will therefore be easily understood that when rotating the shaft 2 by means of the hand wheel file, the shaft 7 will be operated simultaneously, and vice versa if the pulley 10 is rotated.

12 is a table supported on the bracket 13 and provided with upwardly projecting flanges and with a curved arm 14 which passes through a slot provided in the bracket 13 in order that the said table 12 may be placed in any suitable angle. The table 12 may then be secured in the position desired by means of the thumb screw 15 which locks the curved arm 14. The said table 12 may also be moved away from or nearer to the wheel 6 or 7 by means of a hand screw 16 which, at one end, engages a nut 17 secured on the under side of said table 12.

18 is a plate sliding on the rollers 19 on said table 12, and 20 illustrates an end view of a saw rigidly secured to said plate 18 by means of the clamp 21.

The bracket 13 is adjustably supported on the bench 1 in order to adjust the table 12 suitably if a very heavy thick saw is to be filed, as to properly file any saw it is necessary to secure the saw in the center of the wheel.

The wheel 4 is provided with inner slots 22 at equal intervals around its periphery, in which is pivotally secured a file holder 23. 24 is a flat spring, one end of which is secured in the notches 25 provided in the said file holder 23, the other end of said flat spring eventually resting in the bottom of the slot 22, thus causing the file holder 23 to project outwardly. The projection of the file holder may be regulated by removing the spring 24 from one notch to another. 26 is a file secured in said holder 23.

Different sized files may be used in the holder 23, as long as they are so shaped as to fit therein.

In case it is necessary to use a very fine file, and in order that the said file may be well supported, a plate may be placed between the file and the holder. This is not the case with coarse files which are usually made stronger and slightly larger, and the holder 23 preferably made to carry the heavier file.

After a tooth has been filed, it is necessary to push or slide the saw 20, illustrated in Fig. 3, in position for the next file. This is accomplished by means of the switch or guide 28 which is rigidly secured at one end adjacent to one of the files, its free end being adjustably supported on the wheel 4 by means of a bracket 29 in which there is a hand screw 30. This free end of the switch or guide 28 will engage every first or second tooth, as the case may be, and carry same into position for the next operation.

In describing the file holder 23 and the switch, we have referred to these parts as being adapted to the wheel 4; but it will readily be understood that these same parts are adapted on the wheel 9, and that they are simply reversed in their position in order to operate on the other side of the bench, on which is placed a table corresponding to the table 12. On this table is also placed a saw which is ground by the files on the wheel 9.

The files on the wheel 4 will file every second tooth on one side of the saw. When this operation is completed, all that has to be done is to take the plate 18 carrying the saw 20 and place it on the other table, where the teeth that have been left untouched will be filed from the other side, as it is customary in filing a saw to file every second tooth from one side and the other tooth from the other side in order to give it proper way.

It is obvious that a saw may be placed on said table, and that when the first operation is complete the plates 18 on both sides can be interchanged from one side to another.

The file holder 23 normally projects outward from the periphery of the wheel by means of the flat spring 24, in order that when it engages one tooth there will be a certain amount of pressure to give the file its efficiency.

Each holder 23 has a flat top, at one end of which is provided a loop and at the other end a pin parallel to said flat top and adapted to receive a file of specific construction, i. e., pointed at one end of said loop and provided with a hole at the other end to receive said pin.

What I claim is:—

1. A saw filing machine comprising a frame and standards on said frame; a shaft suitably supported on said frame; an adjustable support mounted on said frame; a slidable plate mounted on said adjustable support, said plate being adapted to carry a saw; a wheel mounted on said shaft; means provided on said shaft to file said saw; means to automatically slide said saw; and means to rotate said shaft substantially as described.

2. A saw filing machine comprising a frame and standards supporting said frame; a shaft suitably supported on said frame; an adjustable table mounted on said frame; a slidable plate mounted on said table, said plate being adapted to carry a saw; a wheel mounted on said shaft; file carrying frames pivotally secured on the periphery of said wheel; means to set said file carrying frames at any specified angle; a rod secured at one end adjacent to one of the files and adapted to engage the teeth of the saw at the other end, thereby sliding said saw in position for the next teeth to be filed; and means to rotate said shaft substantially as described.

3. A saw filing machine comprising a frame and standards supporting said frame; a shaft suitably supported on said frame; a wheel mounted on said shaft; frames pivotally secured on the periphery of said wheel, provided with a flat upper portion, one end of which is of a loop shape and the other being provided with a pin, said frames being provided with a downwardly projecting flap at its outer end and a plurality of notches in said flap; a file, one end of which engages said loop on said frame, the other end being provided with a slot to receive said pin on said frame said file being adapted to engage the teeth of a saw; means engaging said notches in said flap to reduce the pitch of said frame; a rod secured at one end to said wheel; means to automatically slide said saw; and means to rotate said shaft substantially as described.

Signed at Montreal, Quebec, Canada, this 14th day of August, 1916.

HARRY ARISTIDE DESPAROIS.

Witnesses:
C. PATENAUDE,
A. P. DEAL.

Copies of this patent may be obtained for five cents each, by addressing the "Commissioner of Patents, Washington, D. C."